Sept. 18, 1956     L. R. BUCKENDALE     2,763,160
VEHICLE DRIVE MECHANISM

Filed Aug. 11, 1952     4 Sheets-Sheet 1

INVENTOR
LAWRENCE R. BUCKENDALE, DECEASED
BY GERTRUDE H. PETSCH, EXECUTRIX

BY Strauch, Nolan & Diggins
ATTORNEYS

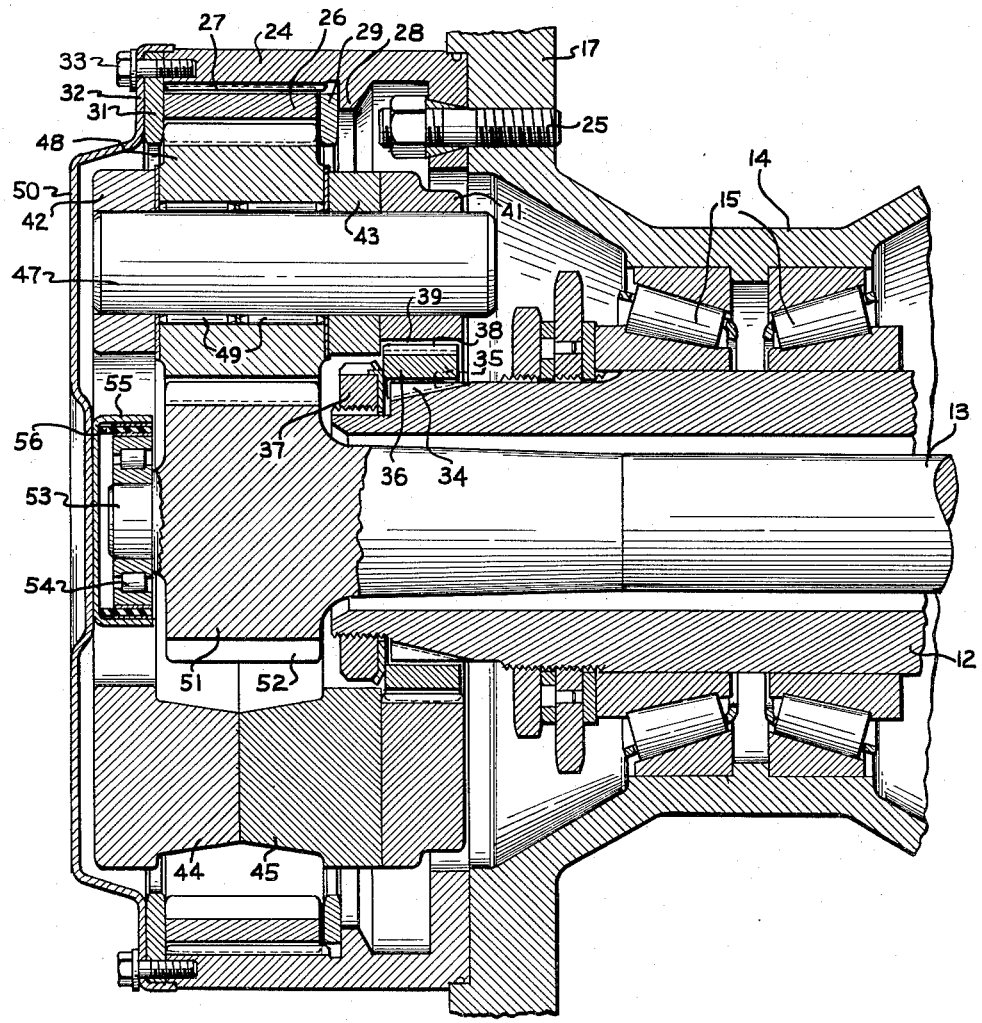

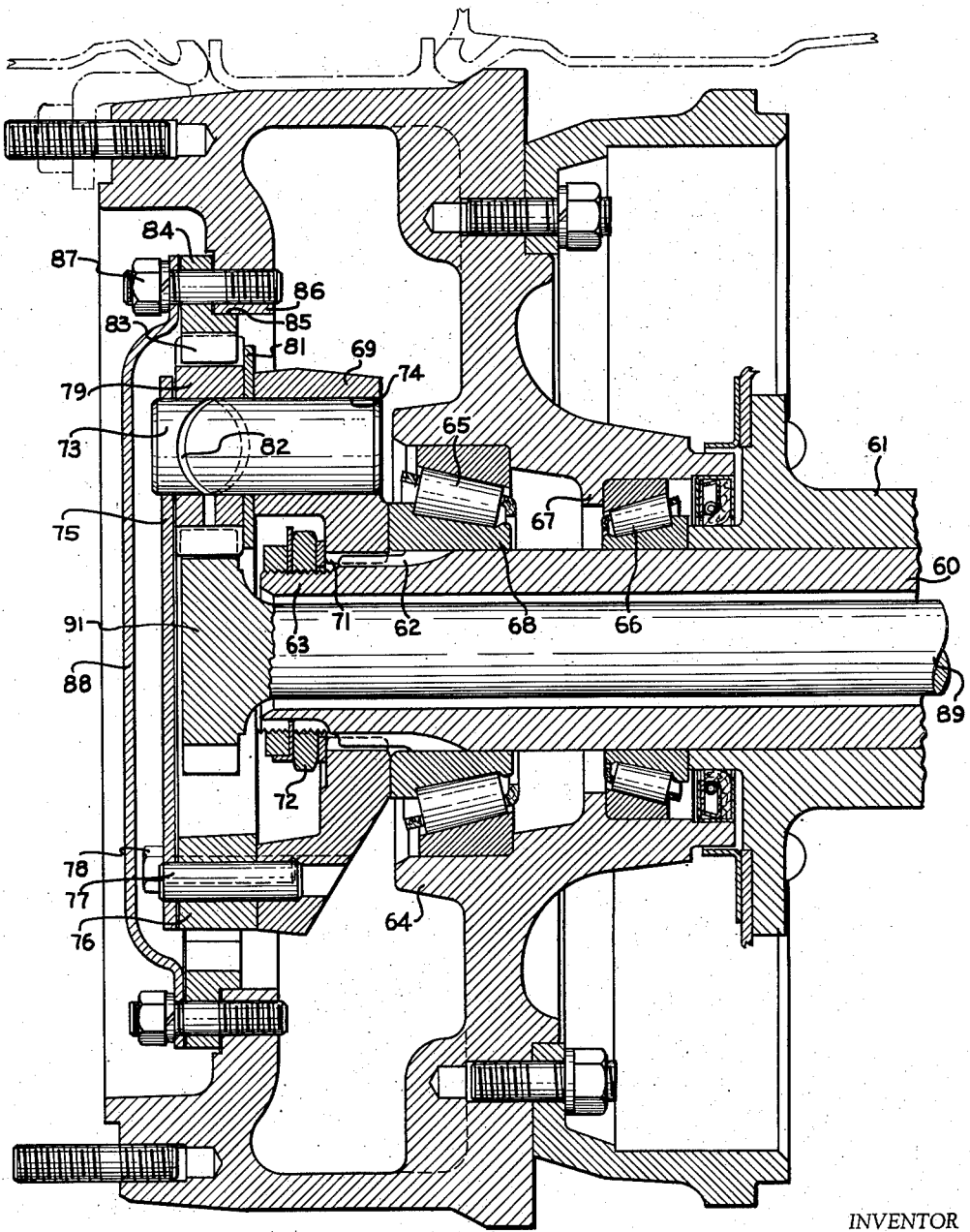

Sept. 18, 1956

L. R. BUCKENDALE 2,763,160

VEHICLE DRIVE MECHANISM

Filed Aug. 11, 1952

INVENTOR
LAWRENCE R. BUCKENDALE, DECEASED
BY GERTRUDE H. PETSCH, EXECUTRIX

BY Strauch, Nolan & Diggins
ATTORNEYS

United States Patent Office 2,763,160
Patented Sept. 18, 1956

2,763,160

VEHICLE DRIVE MECHANISM

Lawrence R. Buckendale, deceased, late of Detroit, Mich., by Gertrude H. Petsch, executrix, Detroit, Mich., assignor, by mesne assignments, to Rockwell Spring and Axle Company, Coraopolis, Pa., a corporation of Pennsylvania Application August 11, 1952, Serial No. 303,658

9 Claims. (Cl. 74—391)

This invention relates to outer end constructions for heavy duty drive axles and particularly to reduction gearing in such axles.

This application is a continuation-in-part of the copending application of Lawrence R. Buckendale Serial No. 645,384 filed February 4, 1946, now United States Letters Patent No. 2,607,431 issued August 19, 1952.

Reduction gear drives in axle outer ends have been heretofore suggested in the prior art, as for example in United States Letters Patent No. 2,337,884 granted to Julius C. Haefeli on December 28, 1943. However, particularly in heavy duty vehicles, these prior structures have not satisfied the need for an efficient, easy to assemble arrangement having the various axles maintained in proper parallelism, and it is the major object of the invention to provide such a novel construction.

A further object of the invention resides in the provision of a simply constructed gear reduction at the wheel ends of the axles which may be easily and quickly assembled or disassembled.

A further object of the invention is to provide a novel outer end support structure for the axle shaft end in drive axle outer end reduction gearing wherein a gear is fixed on the outer end of the axle shaft and the axle shaft has a novel resilient support on the wheel hub outwardly of said gear.

It is another detail object of the invention to provide a simple and novel mounting for the pinion carrier so that it may have limited radial floating movement between the gear on the axle shaft and the ring gear, in order to avoid destructive localized tooth stresses.

A still further object of this invention is to provide each axle shaft at its outer end with a gear and means to resiliently journal the shaft end and center the gear with respect to the surrounding pinions.

Further objects of the invention will appear as the description proceeds in connection with the appended claims and the annexed drawings wherein:

Figure 2 is an enlarged section of part of the axle outer end of Figure 1 illustrating details of the reduction drive gearing;

Figure 5 is an enlarged section of a drive axle outer end according to a further embodiment of the invention.

Figure 1:
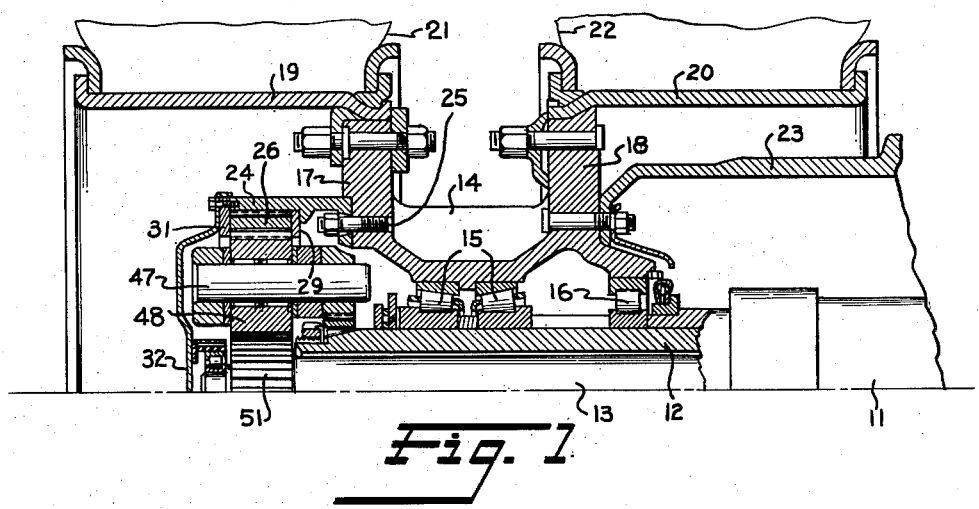
Figure 1 is the upper half of an axial section through a dual wheel drive axle outer end of a preferred embodiment of the invention symmetrical about the axle center line, illustrating particularly the gear reduction between the axle shaft and the associated wheel hub.
Figure 3:
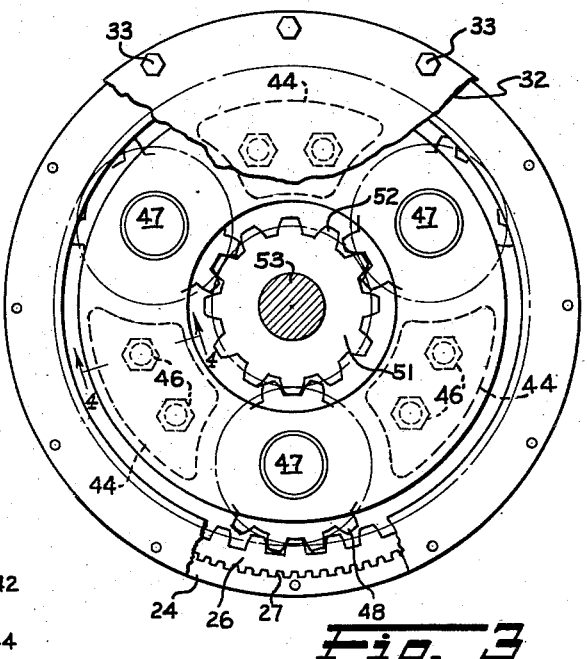
Figure 3 is an end view partially broken away and in section of the drive gearing of Figures 1 and 2.

With reference to Figure 1, each end of a stationary axle housing 11 as illustrated in section is a hollow cylindrical support sleeve 12 through which extend a rotatable drive axle shaft 13 having its inner end connected to the usual axle differential (not shown) and projecting beyond sleeve 12 at its outer end.

A dual tired wheel hub 14 is journalled on sleeve 12 by means of bearings 15 and 16. This hub is provided with spaced radially extending flanges 17 and 18 respectively carrying the rims 19 and 20 upon which the wheel tires 21 and 22 are mounted in the usual manner. A brake drum 23 is secured upon inner flange 18. To the outer side of outer hub flange 17 a cylindrical housing wall 24 for the reduction gearing to be later described is removably secured by means of suitable studs and nuts indicated at 25. This housing wall 24 rigidly carries an internal ring gear 26 which may be non-rotatably secured thereto by mating pressed fit splines 27 on said gear and housing wall as illustrated, or in any other desired manner. Between the inner end of the ring gear 26 and an internal annular shoulder 28 on the housing wall 24 is interposed an annular spacer plate 29. A similar annular spacer plate 31 of somewhat greater width extends over the outer end of ring gear 26 and is secured, together with a flexible sheet metal hub cap 32, to the housing wall 24 by means of cap screws indicated at 33.

The axle housing end sleeve is provided at its end with external tapered splines 34 engaged by coacting internal splines 35 on a mounting ring 36 for the intermediate gear carrier. Ring 36 is forced axially onto splines 35 and secured against outward axial movement with respect to the axle housing by means of the lock nut assembly 37 threaded upon the reduced outer end of the housing and bearing against ring 36. Ring 36 is also provided with external teeth or straight splines 38 engaged by mating internal splines 39 provided upon one annular side of member 41 of the carrier. There is sufficient clearance between the mating teeth 38 and 39 to permit a slight radial floating movement of the carrier with respect to the ring 36 and the axle housing, while effectively preventing rotative movement of the carrier relative to said ring.

Figure 4:
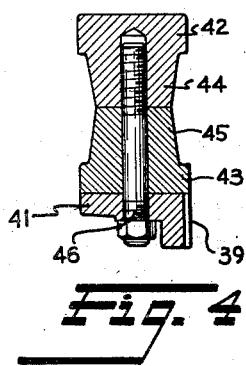
Figure 4 is a fragmentary section on line 4—4 of Figure 3.

The intermediate gear carrier also includes spacing rings 42 and 43 which are provided with circumferentially spaced apertured abutment bosses 44 and 45 held in contact by connecting bolts 46, as shown in Figure 4, and thereby spacing said rings 42 and 43 apart. These rings 42 and 43 and the side member 41 are provided with registering apertures, in which the intermediate gear shafts 47 have a driving fit or are non-rotatably secured by other conventional means, it being noted that ring 43 is in abutting engagement with the side face of the adjacent carrier side member 41. The carrier thus comprises a rigidly connected assembly of side member 41, fixed shafts 47 and fixedly spaced rings 42 and 43.

On each of the shafts 47, an intermediate gear 48 is journalled for free rotation between the rings 42 and 43 on the needle bearings indicated at 49. The axes of gears 48 lie in a circle concentric with axle shaft 13. Each pinion 48 is in constant mesh with ring gear 26. Further, as illustrated in Figure 2, the axially fixed annular plates 29 and 31 overlap the ring gear 26 and the gears 48 to prevent relative axial movement between the gears 48 and the ring gear and maintain the teeth of said gears in full tooth contact. Preferably, the hub cap 32 is provided with an outer annular channel section 50 receiving and clearing the ring 42 of the carrier and which renders the wall of the hub cap somewhat resiliently yieldable in the radial direction.

The outer end of the axle shaft 13 has a gear 51 integrally formed therewith and provided with spur gear teeth 52 in constant mesh with the teeth of all of the gears 48. Beyond gear 51, the axle shaft 13 terminates in a diametrically reduced portion 53 journalled in a bearing 54 resiliently supported in cage member 55 by means of the interposed annular cushion of rubber or other resilient material indicated at 56. The cage member 55 is welded or otherwise rigidly secured to the inner face of the hub cap 32.

It will be evident from the above description that in the transmission of heavy drive torque from the axle shaft to the wheels slight radial movement of the gear is permissible, and by the resilient mounting of the shaft end bearing 54 together with the radially resilient hub cap and the floating mounting of the intermediate gear carrier, the proper centered relation between gear 51 and the surrounding intermediate gears will be attained and maintained to insure an equal distribution of the torque load between said gears 48 and avoid destructive localized tooth pressures.

Referring to the embodiment of Figure 5, the stationary hollow sleeve 60 of axle housing 61 is formed with external splines 62 and an externally threaded reduced terminal 63. A dual wheel hub 64 is mounted on the axle housing by a large outer tapered roller bearing assembly 65 and a smaller tapered roller bearing assembly 66. The inner race of bearing 66 abuts against the end of housing 61 and its outer race abuts internal flange 67 of the hub. The outer race of bearing 65 is seated in an internal hub shoulder and its inner race 68 is abutted by body member 69 of an intermediate gear carrier which is internally splined at 71 for non-rotatable mounting on the axle housing. A suitable lock nut assembly 72 on threaded housing section 63 urges the carrier body 69 tightly against the bearing race 68 and serves as a bearing adjustment as well as to axially secure the carrier on the axle housing.

The intermediate gear carrier comprises also a series of cylindrical fixed shafts 73 force fitted in apertures 74 of carrier body 69 and an outer end plate 75 apertured to fit over the outer ends of shafts 73. A series of circumferentially spaced abutment blocks 76 are mounted on pins 77 force fitted in plate 75 and body 69, and a series of machine screws 78 secure plate 75 to body 69 with a spacing therebetween determined by blocks 76.

An intermediate gear 79 is freely rotatably mounted on each shaft 73 between end plate 75 and a spacer washer 81 rotatable on the shaft between the side of gear 79 and the carrier body. Each shaft 73 has on its surface a lubricant distribution groove 82 for the bore of gear 79. Blocks 76 and shafts 73 are usually three in number and symmetrically arranged like the corresponding bosses and shafts in Figures 1–4.

Gears 79, whose axes lie in a circle concentric with the drive axle shaft, are all constantly meshed with teeth 83 of a ring gear 84 having a shoulder 85 piloted within internal flange 86 of the wheel hub and secured to the hub by a series of studs 87. Studs 87 also secure a shallow dish-shaped sheet metal hub cap 88 to the wheel hub so as to axially enclose the reduction gearing within the hub.

Axle drive shaft 89 is suitably rotatably mounted and drive connected within the axle housing and where it projects beyond sleeve 60 is formed with an integral spur gear 91 meshed with all of the gears 79.

Figure 6:
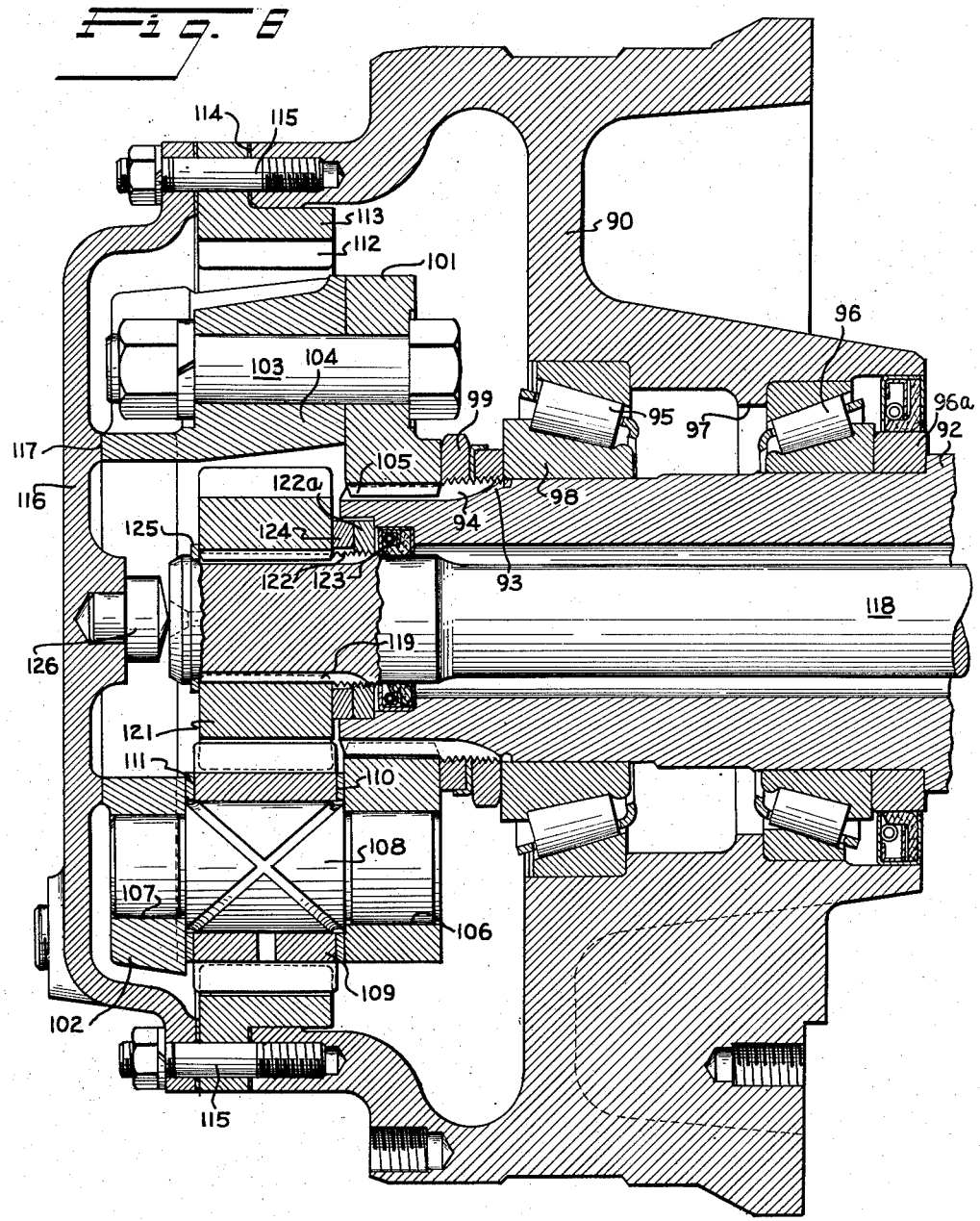
Figure 6 is an enlarged section of a drive axle outer end according to still a further embodiment of the invention.

Referring to the embodiment of Figure 6, the outer hollow sleeve end of axle housing 92 is formed with a threaded section 93 and terminal splines 94. Wheel hub 90 is mounted on the axle housing by tapered roller bearing assemblies 95 and 96. The inner and outer races of bearing 96 abut respectively spacer oil seal ring 96a on the axle housing and hub flange 97. The outer race of bearing 95 seats on an internal shoulder in the hub and its inner race 98 is axially abutted by a bearing adjustment and locknut assembly 99 on threaded section 93 of the axle housing.

The intermediate gear carrier comprises side members 101 and 102 secured rigidly together by bolt assemblies 103 and held in spaced relation by internal abutment bosses 104 integral with one or the other side member. Inner side member 101 is formed with internal splines 105 fitting splines 94 for non-rotatably mounting the carrier on the end of the axle housing. Side members 101 and 102 have aligned apertures 106 and 107 in which are force fitted opposite ends of intermediate gear support shafts 108. Bosses 104 and shafts 108 are preferably three in number and symmetrically distributed as in Figures 1–4.

An intermediate gear 109 is freely rotatably mounted on each shaft 108, with freely rotatable washers 110 and 111 between its side and the side members. Gears 109 are in constant mesh with internal teeth 112 of a ring gear 113 which is secured upon the end face of 114 of hub 90 as by studs 115 and is piloted within the end of hub 90. Studs 115 also secure to hub 90 a dish-shaped cap 116 having an internal flat annular abutment face 117 in contact with outer side member 102 of the carrier. Besides enclosing the gearing, cap 116 also coacts with the locknut assembly at 99 to hold the carrier against axial movement on the axle housing.

Drive axle shaft 118 is provided where it projects from the axle housing with a splined section 119 on which is non-rotatably mounted an internally splined spur gear 121 in constant mesh with gears 109. Inwardly of gear 121, the axle housing end is recessed and shaft 118 is threaded at 122 to receive an annular nut 122a for oil seal 123. Nut 122 and a free spacer ring 124 serve as an abutment limiting inward axial movement of gear 121. Near its outer end and beyond splines 119, shaft 118 is grooved to receive a snap ring 125 that limits outward displacement of gear 121 on splines 119.

A button 126 is fixed within hub cap 116 in alignment with shaft 118 and serves to limit outward axial floating of the drive axle shaft 118.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle drive mechanism, an axle housing, a drive axle shaft rotatably mounted within said housing and projecting beyond an open end of the housing, a gear on said projecting end of said shaft, a gear carrier non-rotatably mounted on the adjacent outer end of said housing, a plurality of freely rotatably intermediate gears on said carrier all in constant mesh with said axle shaft gear, a wheel hub mounted on bearings on said axle housing, peripheral means on said wheel hub for removably securing a tire rim to said hub, and means located radially inwardly of said tire securing means for independently removably mounting a ring gear on the outer end of said hub.

2. In a vehicle drive mechanism, an axle housing, an axle drive shaft rotatably mounted in said housing and projecting beyond an open end of said housing, a wheel hub rotatably mounted on said axle housing, a gear non-rotatably mounted on the projecting end of said drive shaft, a gear carrier non-rotatably mounted on the end of said axle housing by means of internal longitudinal splines on the carrier mated with corresponding splines fixed on the axle housing, a plurality of freely rotatable intermediate gears on said carrier all constantly meshed with said axle shaft gear, and an internal ring gear on said wheel hub constantly meshed with all of said intermediate gears, said splined mounting of the carrier on the axle housing having sufficient radial clearance between the splines for providing limited but definite radial floating of said carrier and the intermediate gears thereon between said axle shaft gear and said ring gear.

3. In a vehicle drive mechanism, an axle housing, an axle shaft rotatably mounted in said housing and projecting beyond an open end of said housing, a wheel hub rotatably mounted on said housing, a gear on said projecting end of said shaft, a gear carrier non-rotatably mounted on said housing end, a plurality of freely rotatable intermediate gears on said carrier all constantly meshed with said axle shaft gear, an internal ring gear on said wheel hub constantly meshed with all of said intermediate gears, a hub cap secured over the outer end of said hub and enclosing said gears, a bearing resiliently mounted on said hub cap, and means mounting the end of said axle shaft beyond the axle shaft gear in said bearing.

4. In the drive mechanism defined in claim 3, said resiliently mounted bearing comprising a roller bearing annulus on the shaft end, a collar fixed to the hub cap and surrounding said bearing annulus, and a sleeve of resilient material between the collar and bearing annulus.

5. In combination with a vehicle axle shaft, a housing therefor and a wheel hub journaled on said housing, a gear reduction wheel driving unit comprising a gear fixed on the axle shaft, a ring gear fixed to the wheel hub, a plurality of intermediate idler gears in constant mesh with the axle shaft and ring gears, and means for resiliently journaling the axle shaft relative to the wheel hub yieldably resisting radial displacement of the axle shaft gear under torque load to maintain equal distribution of the torque to said intermediate gears.

6. The combination defined in claim 5, together with a carrier on which the intermediate gears are journaled, and means non-rotatably connecting said carrier with the shaft housing constructed to permit limited radial floating movement of the carrier and intermediate gears and prevent destructive localized tooth stresses.

7. The combination defined in claim 5, together with a cap fixed to wheel hub, and wherein said resilient journal comprises a cage member fixed to the inner face of said cap, a shaft end bearing, and a radially resilient cushion interposed between said bearing and the cage wall.

8. The combination defined in claim 5, in which said resilient journal includes a cap member fixed to the wheel hub and having a radially yieldably annular channel section, and a shaft end bearing mounted on the inner face of said cap member.

9. In a drive axle assembly, a driven axle shaft, an axle housing for said shaft, a gear on the outer end of said shaft, a ring gear rigid with a wheel to be driven by said shaft, a plurality of intermediate gears interposed between said axle shaft and ring gears having teeth in constant mesh therewith, a carrier for said intermediate gears mounted on said housing with provision for limited radial float so that during transmission of drive torque from the axle shaft to the wheel said float permits radial shift of the carrier to substantially equalize distribution of torque load on the meshed gear teeth, and means resiliently mounting the end of said axle shaft on said wheel.

References Cited in the file of this patent
UNITED STATES PATENTS

| | | |
|---|---|---|
| 1,444,937 | Nogrady | Feb. 13, 1923 |
| 1,464,978 | Einfeldt | Aug. 14, 1923 |
| 1,919,925 | Blakeslee | July 25, 1933 |
| 2,337,884 | Haefeli | Dec. 28, 1943 |

FOREIGN PATENTS

| | | |
|---|---|---|
| 574,804 | France | Apr. 5, 1924 |